(12) United States Patent
Mawhinney

(10) Patent No.: US 12,070,147 B1
(45) Date of Patent: Aug. 27, 2024

(54) SYSTEM OF OPTIMIZED PORTABLE FORMULA BREWING AND/OR DISPENSING

(71) Applicant: Ross Mawhinney, Livingston, TX (US)

(72) Inventor: Ross Mawhinney, Livingston, TX (US)

( * ) Notice: Subject to any disclaimer, the term of this patent is extended or adjusted under 35 U.S.C. 154(b) by 0 days.

(21) Appl. No.: 18/522,819

(22) Filed: Nov. 29, 2023

(51) Int. Cl.
| | |
|---|---|
| A47J 31/00 | (2006.01) |
| A47J 31/40 | (2006.01) |
| A47J 31/44 | (2006.01) |
| A47J 31/46 | (2006.01) |
| A47J 31/52 | (2006.01) |

(52) U.S. Cl.
CPC ........... *A47J 31/005* (2013.01); *A47J 31/407* (2013.01); *A47J 31/4407* (2013.01); *A47J 31/461* (2018.08); *A47J 31/525* (2018.08)

(58) Field of Classification Search
CPC .................................................... A47J 31/005
See application file for complete search history.

(56) References Cited

U.S. PATENT DOCUMENTS

| | | | | |
|---|---|---|---|---|
| 5,832,809 | A * | 11/1998 | Gras ..................... | A47J 31/547 219/689 |
| 7,387,063 | B2 * | 6/2008 | Vu ........................ | A47J 31/007 206/217 |
| 9,713,399 | B2 | 7/2017 | Boone et al. | |
| 10,870,566 | B2 | 12/2020 | Green et al. | |
| 2003/0178419 | A1 * | 9/2003 | Policappelli .......... | A47J 31/547 219/689 |
| 2003/0192434 | A1 * | 10/2003 | Koslow ................... | A47J 31/02 99/306 |
| 2019/0328170 | A1 | 10/2019 | Cai | |
| 2020/0337490 | A1 * | 10/2020 | Li .......................... | A47G 19/16 |
| 2021/0274958 | A1 | 9/2021 | Boone et al. | |
| 2024/0122395 | A1 * | 4/2024 | Diskin .................... | A47J 31/38 |

FOREIGN PATENT DOCUMENTS

| | | | | |
|---|---|---|---|---|
| CN | 204158140 | U * | 2/2015 | |
| CN | 108968685 | A * | 12/2018 | ............ A47J 31/005 |
| CN | 111743404 | A * | 10/2020 | |
| FR | 2579880 | A1 * | 10/1986 | .......... B67D 3/0077 |
| KR | 100812794 | B1 * | 3/2008 | .............. A47J 31/06 |
| KR | 20210130388 | A * | 11/2021 | .......... A47J 31/0626 |
| WO | WO-2019053623 | A1 * | 3/2019 | ............ A47J 31/005 |

\* cited by examiner

*Primary Examiner* — John J Norton
(74) *Attorney, Agent, or Firm* — Owen G. Behrens; Smith & Hopen, P.A.

(57) ABSTRACT

Described herein relates to a system of and method for optimized and/or automated portable formula and/or beverage brewing and/or dispensing. The portable formula brewing system may be configured to portably brew and/or output a preselected formula and/or beverage. Additionally, the portable formula brewing system may comprise an input bottle (e.g., a water bottle and/or a plastic bottle) and/or an output bottle (e.g., an infant bottle and/or a water bottle) configured to removably couple to the housing, such that any fluid container may be integrated into the portable formula brewing system. Moreover, the portable formula brewing system may comprise a heating and/or cooling element configured to continuously regulate the temperature of the fluid and/or at least one processor communicatively coupled to the at least one heating element and/or at least one cooling element configured to control operational features and/or store a plurality of user-specific parameters for the portable formula brewing system.

14 Claims, 8 Drawing Sheets

SYSTEM OF OPTIMIZED PORTABLE FORMULA BREWING AND/OR DISPENSING

BACKGROUND OF THE INVENTION

1. Field of the Invention

This invention relates, generally, to portable beverage makers. More specifically, it relates to a system of and method for optimized and/or automated portable formula and/or beverage brewing and/or dispensing.

2. Brief Description of the Prior Art

Consumers desire the convenience, speed and freshness of drinks made to their liking. This is especially true for parents caring for infants either at home or traveling. As known in the art, infant formula must be prepared and/or served at specific temperatures. Additionally, the prepared infant formula can spoil if it is left out at room temperature, it must be used within 2 hours of preparation, and must be used within one hour from when feeding begins.

Because of these preparation factors, infant formula and/or similar styles and/or forms of beverages and/or foods (e.g., oatmeal, hot chocolate, coffee, tea, etc.) cannot simply be consumed just anywhere. Typically, these beverages are restricted to being made at homes or offices, being bought from restaurants, cafés and/or other places due to the lack of access to hot water needed for brewing. Additionally, infant formula generally requires several minutes for brewing, and therefore can create complications to prepare when wanting to have one's tea or coffee to drink "on the go." For example, formula preparation may include multiple steps for heating water, brewing the formula (e.g., to control the "strength" of the tea), and transporting the formula, any of which causes the parent and/or family to delay departure (e.g., while water heats) and/or be disordered.).

In addition, these types of hot beverages are typically made at relatively high temperatures that are generally too hot for consumption and therefore must go through a cooling process such as a natural dissipation of heat to the surrounding environment, which can be naturally slow to cool. Cooling in a closed portable container such as a double walled vacuum sealed container and/or a closed mug can take a considerable amount of time depending on the design to dissipate heat. It is therefore beneficial to control venting for a closed container that contains coffee, tea, or other beverages to be consumed from the container.

As such, in order to brew the ideal infant formula and/or other beverages, the temperature of the water should be regulated at particular temperature(s) that correspond to appropriate brewing conditions for the certain type of formula, coffee, tea, and/or other beverages. As stated above, infant formula must be prepared and/or served at a specific temperatures (i.e., when preparing the formula, the water must be heated to 158° F. and/or the formula must be served at 98.6° F.) to aid in the infant's digestion while also protecting the infant from any feeding injuries, such as burns. It is therefore beneficial to control the setting of the water's temperature by the user, e.g., based on user-selected temperature settings associated with the specific type of formula and/or beverage the individual and/or user will brew.

Another factor in preparing an ideal cup of coffee, tea or other beverage includes brewing the beverage for a particular amount of time, e.g., dependent on the particular type of formula material to get a desired levels of extraction or diffusion of the compounds in the water. Without precise control of the brewing time, for example, the brewing process could lead to over brewing and the beverage may become bitter or have undesired tastes. It is therefore beneficial to control the amount of time the brewing occurs, e.g., at the particular temperature, and be definable by the user, such that the user can select brewing time settings associated with the specific type of tea or coffee the user will brew.

Another factor in preparing an ideal cup of coffee, tea or other beverage includes the movement or flow of the fluid (e.g., water) as it contacts the formula material during the brewing stage. For example, the flow of water during brewing affects the speed at which compounds from the formula material are extracted, and therefore, the overall composition and quality of the brewed beverage. Therefore, it is beneficial to control the flow or movement of fluid during brewing to provide greater control over extraction and allow a user to regulate the fluid flow based on the type of formula material (e.g., type of baby formula, oatmeal, tea, coffee, etc.) and his/her beverage preferences (e.g., "strength" of tea, coffee, etc.).

Yet another factor to prepare an ideal infant formula and/or an ideal cup of coffee, tea or other beverage "on the go" is achieving the space efficiency required to offer complex functionality while preserving portability. Typically, conventional brewing devices and/or systems require at least two spatially separate compartments, i.e., one for storing fluid and one for storing formula and/or beverage material, before the brewing process begins. Such inefficient use of space in conventional brewing devices and systems limit their utility and aesthetic design with regard to size, footprint, volume and/or weight of the brewing components and assemblies. Therefore, it is beneficial to have a brewing assembly able to store fluid and/or formula and/or beverage materials separately and/or control their brewing together, within the same overall volume, creating space-efficiency while providing control of the brewing conditions (e.g., time to start, duration, etc.).

In this manner, existing beverage-brewing devices such as conventional beverage brewers and/or machines have traditionally been implemented as standalone, table-top devices where a user sources their own infant formula material and/or beverage material from an infant formula material producer and/or a beverage material producer that is typically a different company than the brewing device manufacturer. Yet, with the introduction of single serve pod machines, another standard was created with some added conveniences in which only a certain pod can brew in the machine; however, with this standard comes the inability for the large number of beverage material retailers from selling to those customers because of the high costs for manufacturing the pods due to the complexity and the inability to scale the manufacturing process from a small retailer to a large retailer. This large cost creates a high barrier to entry where a small number of retailers are able to compete and capture a high volume of consumers which therefore creates an additional barrier to entry besides cost, the need to supply a large number of pods in order to compete competitively.

The inability for infant formula material and/or beverage material retailers of all sizes to be connected with a standard convenient system of brewing creates a need for a new, integrated beverage platform that can effectively satisfy any retailer's inventory demands, e.g., whether large or small demands, and also be scaled to suit the retailer's needs (e.g., modular system) allowing the retailer to be connected directly with the consumer to receive product orders from anywhere in the world, to advertise to their ideal customers, and to provide unique experiences to their customers.

Accordingly, what is needed is safe, effective, efficient, and easy-to-use system and method for optimized portable formula and/or beverage brewing and/or dispensing. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to a system of portable formula and/or beverage brewing and/or dispensing. In an embodiment, the system may comprise the following: (a) a housing comprising an internal chamber, the internal chamber having at least one compartment configured to retain at least one brewing pod; (b) an input bottle comprising at least one opening, the input bottle configured to removably couple to a top surface of the housing; and (c) an output bottle comprising at least one opening, the output bottle configured to removable couple to a bottom surface of the housing. In this embodiment, the housing may also comprise at least one channel in fluid communication with the input bottle and/or the output bottle. In addition, in this embodiment, a fluid may be disposed within the input bottle, such that the fluid may be configured to translate through the at least one channel into the at least one compartment. In this manner, the fluid may interact with the at least one brewing pod, such that, subsequent to interacting with the at least one brewing pod for a predetermined amount of time, the brewed formula and/or the brewed beverage may be configured to translate through the at least one channel into the output bottle.

In some embodiments, the housing further comprises a lid, the lid being configured to be removably coupled to the housing. Accordingly, in these other embodiments, an internal perimeter of the internal chamber may comprise a threading, and as such, a bottom surface of the lid may also comprise a protrusion having a threading complimentary of the internal perimeter of the internal chamber, allowing the lid to removably couple to the housing.

In some embodiments, the system may further comprise at least one heating element, at and/or least one cooling element in mechanical communication and/or thermal communication with the at least one brewing pod and/or the fluid. In addition, in these other embodiments, the at least one heating element and/or the at least one cooling element may be disposed within the internal chamber of the housing. Moreover, the at least one channel may also comprise at least two valves disposed about at least a portion of the at least one channel, such that the at least two valves may be configured to translate between an open position and a closed position, regulating the follow of the fluid through the at least one compartment.

Additionally, in some embodiments, the system may further comprise at least one actuator, in which the at least one actuator may be in mechanical communication with the at least two valves. In these other embodiments, the system may also comprise a computing device having at least one processor, such that subsequent to receiving an electrical signal to initiate a brewing process, the at least one processor may be configured to transmit an electrical signal to the at least one actuator to translate one of the at least two valves from the closed position to the open position. As such, the fluid may be allowed to flow into the at least one compartment, such that the fluid may interact with the at least one brewing pod. Moreover, in these other embodiments, subsequent to reaching the predetermined amount of time, the at least one processor may also be configured to transmit an electrical signal to the at least one actuator to translate an additional valve of the at least two valves from the closed position to the open position, such that the brewed formula and/or beverage may be allowed to flow from the at least one compartment into the output bottle.

In some embodiments, the system may also comprise the following: (i) at least one user-interface communicatively coupled to the at least one processor of the computing device; and (ii) executable instructions provided by at least one user, via the at least one user-interface. In these other embodiments, the executable instructions may comprise at least one of a plurality of predetermined parameters associated with the selected formula and/or. In this manner, the executable instructions may also be configured to cause the at least one processor to initiate the at least one heating element and/or the at least one cooling element to regulate the temperature and/or a consistency of the fluid based on the predetermined parameters associated with the selected formula and/or beverage.

In some embodiments, the system may also comprise at least one power station. In these other embodiments, the at least one power station may be configured to provide an electrical energy to at least one power supply of the portable formula brewing system and/or at least one external computing device. As such, the at least one power supply and/or the at least one external computing device may be charged, via the at least one power station, while the portable formula brewing system is activated and/or deactivated.

Moreover, another aspect of the present disclosure pertains to a system for portable formula and/or beverage brewing and/or dispensing. In an embodiment, the system may comprise the following: (a) a housing comprising an internal chamber, the internal chamber comprising at least one compartment configured to retain at least one brewing pod; (b) an input bottle comprising at least one opening, the input bottle configured to removably couple to a top surface of the housing; (c) an output bottle comprising at least one opening, the output bottle configured to removable couple to a bottom surface of the housing, such that the housing may comprise at least one channel in fluid communication with the input bottle and/or the output bottle; (d) at least one heating element and/or at least one cooling element in mechanical communication and/or thermal communication with the at least one brewing pod and/or the fluid, such that the at least one heating element and/or the at least one cooling element may be disposed within the internal chamber of the housing; (e) at least two valves disposed about at least a portion of the at least one channel, such that the at least two valves may be configured to translate between an open position and a closed position; (f) at least one actuator, the at least one actuator being in mechanical communication with the at least two valves; and (g) a computing device having at least one processor, such that subsequent to receiving an electrical signal to initiate a brewing process, the at least one processor may be configured to transmit an electrical signal to the at least one actuator to translate the at least two valves from the closed position to the open position, regulating the interaction of the fluid with the at least one brewing pod. In this embodiment, subsequent to interacting with the at least one brewing pod for a predetermined amount of time, the brewed formula may then be configured to translate through the at least one channel into the output bottle.

In some embodiments, the system may also comprise the following: (i) at least one user-interface communicatively coupled to the at least one processor of the computing device; and (ii) executable instructions provided by at least one user, via the at least one user-interface. In these other embodiments, the executable instructions may comprise at least one of a plurality of predetermined parameters associated with the selected formula and/or. In this manner, the executable instructions may also be configured to cause the at least one processor to initiate the at least one heating element and/or the at least one cooling element to regulate the temperature and/or a consistency of the fluid based on the predetermined parameters associated with the selected formula and/or beverage.

In some embodiments, the system may also comprise at least one power station. In these other embodiments, the at least one power station may be configured to provide an electrical energy to at least one power supply of the portable formula brewing system and/or at least one external computing device. As such, the at least one power supply and/or the at least one external computing device may be charged, via the at least one power station, while the portable formula brewing system is activated and/or deactivated.

Furthermore, an additional aspect of the present disclosure pertains to a method for portable for portable formula, beverage, or both brewing, utilizing a portable formula brewing system In an embodiment, the method may comprise the following steps, including but not limited to: (a) removably coupling an input bottle and/or an output bottle to a housing of the portable formula brewing system, in which the input bottle may comprise a fluid disposed within the input bottle, and in which the portable formula brewing system may also comprise at least one heating element and/or at least one cooling element disposed within the housing, such that the at least one heating element and/or the at least one cooling element may be in thermal communication with at least one compartment configured to retain at least one brewing pod; (b) heating, via at least one heating element of the portable formula brewing system, the fluid to a predetermined temperature associated with the formula and/or beverage; (c) disposing the heated fluid into the at least one compartment comprising the at least one brewing pod for a predetermined amount of time; and (d) subsequent to reaching the predetermined amount of time, outputting the brewed formula and/or brewed beverage from the at least one compartment into the output bottle.

In some embodiments, the portable formula brewing system may further comprise: (i) at least one channel disposed within the housing, the at least one channel being in fluid communication with the input bottle and/or the output bottle; (ii) at least two valves disposed about at least a portion of the at least one channel, such that the at least two valves may be configured to translate between an open position and a closed position; (iii) at least one actuator, the at least one actuator being in mechanical communication with the at least two valves; and (iv) a computing device having at least one processor, such that the at least one processor may be communicatively coupled to the at least one heating element, the at least one cooling element, the at least one actuator, and/or a combination of thereof.

In these other embodiments, the step of disposing the heated fluid into the at least one compartment may further comprise the step of, subsequent to receiving an electrical signal to initiate a brewing process, transmitting, via the at least one processor of the computing device, an electrical signal to the at least one actuator to translate one of the at least two valves from the closed position to the open position, such that the fluid may be allowed to flow into the at least one compartment, such that the fluid may interact with the at least one brewing pod. Accordingly, in these other embodiments, the step of outputting the brewed formula and/or brewed beverage, from the at least one compartment into the output bottle may also further comprise the step of, subsequent to reaching the predetermined amount of time, transmitting, via the at least one processor of the computing device, an electrical signal to the at least one actuator to translate an additional valve of the at least two valves from the closed position to the open position, such that the brewed formula and/or the brewed beverage may be allowed to flow from the at least one compartment into the output bottle.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
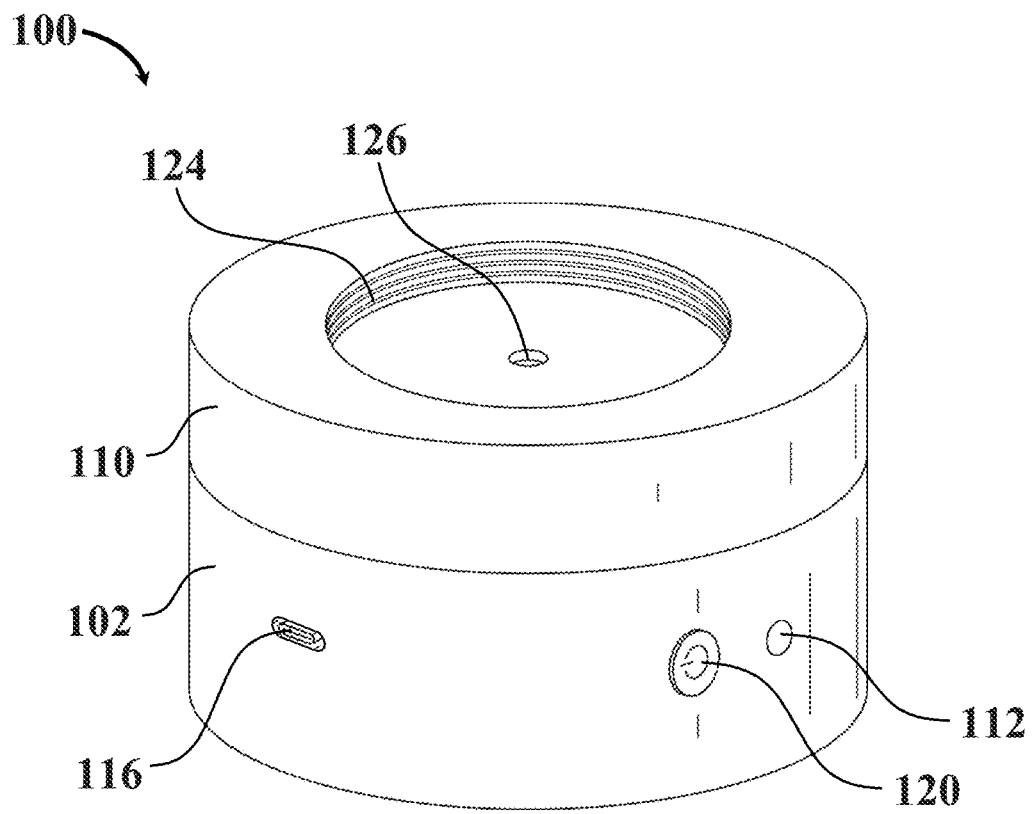
FIG. 1 is a graphical representation depicting a top perspective view of a housing of a portable beverage brewing system, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims.

Furthermore, the use of certain terms in various places in the specification, described herein, are for illustration and should not be construed as limiting. For example, any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Referring in general to the following description and accompanying drawings, various embodiments of the present disclosure are illustrated to show its structure and method of operation. Common elements of the illustrated embodiments may be designated with similar reference numerals.

Accordingly, the relevant descriptions of such features apply equally to the features and related components among all the drawings. For example, any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g. circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

As used herein, the term "communicatively coupled" refers to any coupling mechanism configured to exchange information (e.g., at least one electrical signal) using methods and/or devices known in the art. Non-limiting examples of communicatively coupling may include Wi-Fi, Bluetooth, wired connections, wireless connection, quantum, and/or magnets. For ease of reference, the exemplary embodiment described herein refers to Wi-Fi and/or Bluetooth, but this description should not be interpreted as exclusionary of other electrical coupling mechanisms.

As used herein, the term "mechanical communication" refers to any coupling mechanism configured to transmit and/or exchange any force known in the art using any methods and/or device known in the art. Non-limiting examples of mechanical communication may include mechanical coupling, clamps, gear drives, gear shafts, drive shaft, universal joint, sleeve coupling, roller chain coupling, flange coupling, Oldham coupling, Split Muff coupling, and/or flange couplings. For ease of reference, the exemplary embodiment described herein refers to mechanical coupling, but this description should not be interpreted as exclusionary of other mechanical coupling mechanisms.

As used herein, the term "fluid communication" refers to any coupling mechanism known in the art configured to transmit and/or exchange any fluid known in the art using any methods and/or device known in the art. Non-limiting examples of fluid communication may include fluid coupling, tubing, tubing nipples, plumbing connectors, plumbing fittings, fluid clamps, valves, pressure valve, and/or pressure coupling. For ease of reference, the exemplary embodiment described herein refers to tubing, tubing nipples, and/or valves, but this description should not be interpreted as exclusionary of other fluid coupling mechanisms.

As used herein, the term "thermal communication" refers to any mechanism known in the art configured to transmit, conduct, exchange, and/or diffuse heat (e.g., thermal conduction and/or thermal convection) using any method and/or devices known in the art. Non-limiting examples of thermal communication may include thermal conduction, thermal convection, radiation, and/or induction. For ease of reference, the exemplary embodiment described herein refers to thermal conduction and/or thermal convection, but this description should not be interpreted as exclusionary of other heat transfer methods and/or devices.

As used herein, the term "coupling mechanism" refers to any apparatus known in the art configured to temporarily affix one object to at least one alternative object. Non-limiting examples of the coupling mechanism may include a screw, a nail, a rivet, a magnet, and/or an adhesive. For ease of reference, the exemplary embodiment described herein refers to a screw, but this description should not be interpreted as exclusionary of other coupling mechanisms.

As used herein, the term "actuator" refers to any motor known in the art configured to drive movement (e.g., linear movement and/or rotational movement). Non-limiting examples of the actuator may include a stepper motor comprising at least 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, and/or 30 degrees per step, a brushed and/or brushless AC motor, a brushed and/or brushless DC motor, a AC induction motor, and/or a DC servo motor. For ease of reference, the exemplary embodiment described herein refers to a stepper motor, but this description should not be interpreted as exclusionary of other AC motors and/or DC motors.

As used herein, the term "mixing mechanism" refers to any mixing and/or blending device and/or component known in the art configured integrate at least one substance and/or compound within a fluid, creating a homogenous solution. Non-limiting examples of the mixing mechanism may include a mixing blade, paddles, intertwined metal strips, a blending blade, an agitator, an emulsifier, a waterjet, water propulsor, a fan, a tumbler a batch mixer, paddle mixer, container mixer, ribbon mixer, and/or a static mixer. For ease of reference, the exemplary embodiment described herein refers to an agitator, water propulsor, and/or a tumbler, but this description should not be interpreted as exclusionary of other mixing and/or blending devices and/or components.

As used herein, the terms "about," "approximately," or "roughly" refer to being within an acceptable error range for the particular value as determined by one of ordinary skill in the art, which will depend in part on how the value is measured or determined (e.g., the limitations of a measurement system), (e.g., the degree of precision required for a particular purpose, such as brewing and/or dispensing a formula and/or beverage). As used herein, "about," "approximately," or "roughly" refer to within ±25% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Portable Formula and/or Beverage Brewing System

The present disclosure pertains to a system of and method for optimized and/or automated portable formula (e.g., infant formula) and/or beverage (e.g., coffee, tea, soda, oatmeal, etc.) brewing and/or dispensing. In an embodiment, portable formula and/or beverage brewing system (hereinafter "portable formula brewing system") may comprise a housing configured to retain a brewing pod, such that portable formula brewing system may be configured to automatically generate a formula and/or beverage based on the preselected brewing pod. Additionally, portable formula brewing system may comprise a wireless (e.g., Wi-Fi and/or Bluetooth) access point, in order to allow communication between the portable formula brewing system and at least one computing device having at least one external computing device (e.g., mobile phone, computer, laptop, and/or tablet).

Additionally, in an embodiment, the portable formula brewing system may be configured to provide a plurality of parameters, via a graphical user-interface and/or a computing device communicatively coupled to the portable formula brewing system, such that at least one user may select at least one of the plurality of parameters to brew their "ideal" formula and/or beverage. In this embodiment, the portable formula brewing system may comprise of a lightweight, non-toxic material (e.g., plastic, aluminum, etc.), such that the at least one user may brew the formula and/or beverage while carrying and/or traveling with the portable formula brewing system. In this manner, portable formula brewing system may be configured to initiate, perform, and/or complete the brewing process while being actively translated (e.g., while being shaken by the at least one user, while on a walk and/or run with the at least one user, during transport by a vehicle (e.g., car, boat, and/or airplane), and/or while being dropped by the at least one user).

In an embodiment, the portable formula brewing system may comprise a weight having a range of at least about 0.01 pounds to at most about 5.00 pounds, encompassing every value in between. For example, in some embodiments, the portable formula brewing system may comprise a weight of at most 1.0 pounds. In this manner, the portable formula brewing system may also comprise size dimensions suitable for portable brewing. As such, the portable formula brewing system may comprise a length having a range of at least about 2.0 inches to at most about 20.0 inches, encompassing every value in between. In addition, the portable formula brewing system may comprise a width having a range of at least about 0.5 inches to at most about 10 inches, encompassing every value in between, and/or a height having a range of at least about 4.0 inches to at most about 20.0 inches, encompassing every value in between. For example, in some embodiments, the portable formula brewing system may comprise a length of at most 4.0 inches, a width of at most 5 inches, and/or a height of at most 10 inches.

Moreover, in an embodiment, the portable formula brewing system may comprise a heating element and/or a cooling element, such that the at least one user may individually select the temperature for the beverage and/or the portable formula brewing system may automatically determine the appropriate temperature for the preselected formula and/or beverage. Furthermore, in this embodiment, the portable formula brewing system may comprise at least one user-interface, such that the portable formula brewing system may transmit a plurality of notifications indicative of the following, including but not limited to, a successful brewing process, an unsuccessful brewing process, a blockage, failure to successfully couple at least one bottle to the portable formula brewing system, the current temperature of the formula and/or beverage, the ideal drinking temperature for the formula and/or beverage, overheating of the portable formula brewing system, low power, activation and/or shutdown of the portable formula brewing system, a total amount of time the formula and/or beverage is viable to drink, and/or identification of the preselected formula and/or beverage.

The system and method will be described in greater detail in the sections herein below.

As shown in FIG. 1, in an embodiment, portable formula brewing system 100 may comprise a housing 102 comprising a top surface and a bottom surface. Additionally, housing 102 may also comprise a lid 110, such that a bottom surface of lid 110 may be configured to be removably coupled (e.g., mechanical coupling and/or rotationally coupled) to the top surface of housing 102. As such, as stated above, portable formula brewing system 100 may comprise a computing device having at least one processor disposed within housing 102. In this embodiment, the at least one processor may be communicatively coupled to at least one of the following, including but not limited to an activation switch 120, an activation light 112, the heating element, the cooling element, at least one user-interface, and/or a power port 116 (e.g., a USB-C female connector).

Figure 4:
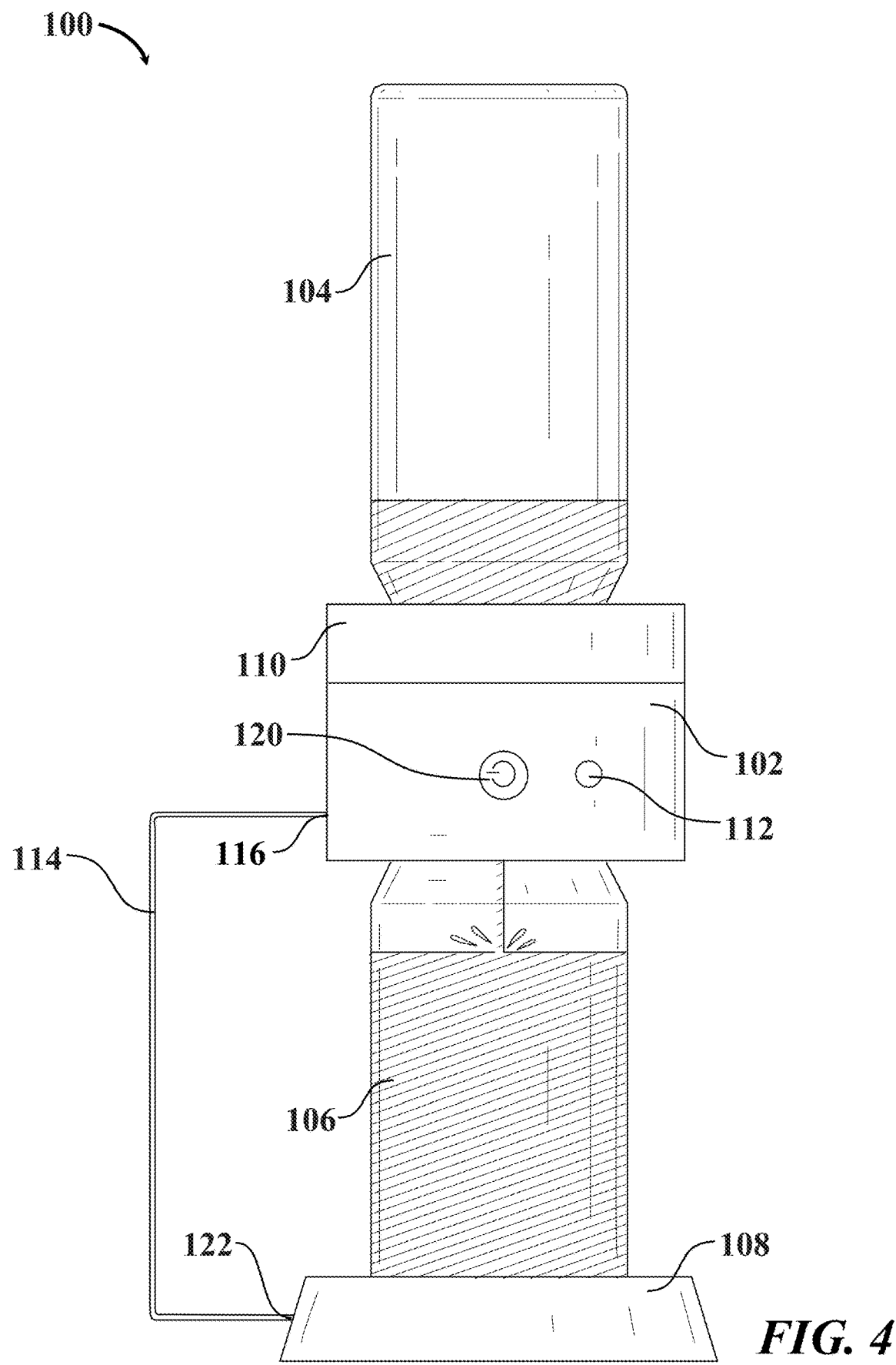
FIG. 4 is a graphical representation depicting a first exemplary embodiment of a portable beverage brewing system, according to an embodiment of the present disclosure

Moreover, as shown in FIG. 1, in conjunction with FIG. 4, in an embodiment, a top surface of lid 110 may comprise at least one receiving cavity 124 comprising at least one receiving aperture 126. In this manner, at least one receiving cavity 124 may be configured to removably couple (e.g., rotationally couple and/or frictionally couple) to an external input bottle 104 (hereinafter "input bottle 104") (e.g., a water bottle and/or a plastic bottle), such that the outer perimeter of at least one receiving cavity 124 and input bottle 104 may abut, creating a water tight seal. In this manner, input bottle 104 may comprise any bottle known in the art configured to retain a fluid. For ease of reference, the exemplary embodiment described herein refers to a water bottle and/or a disposable plastic bottle, but this description should not be interpreted as exclusionary of other bottles.

Figure 2:
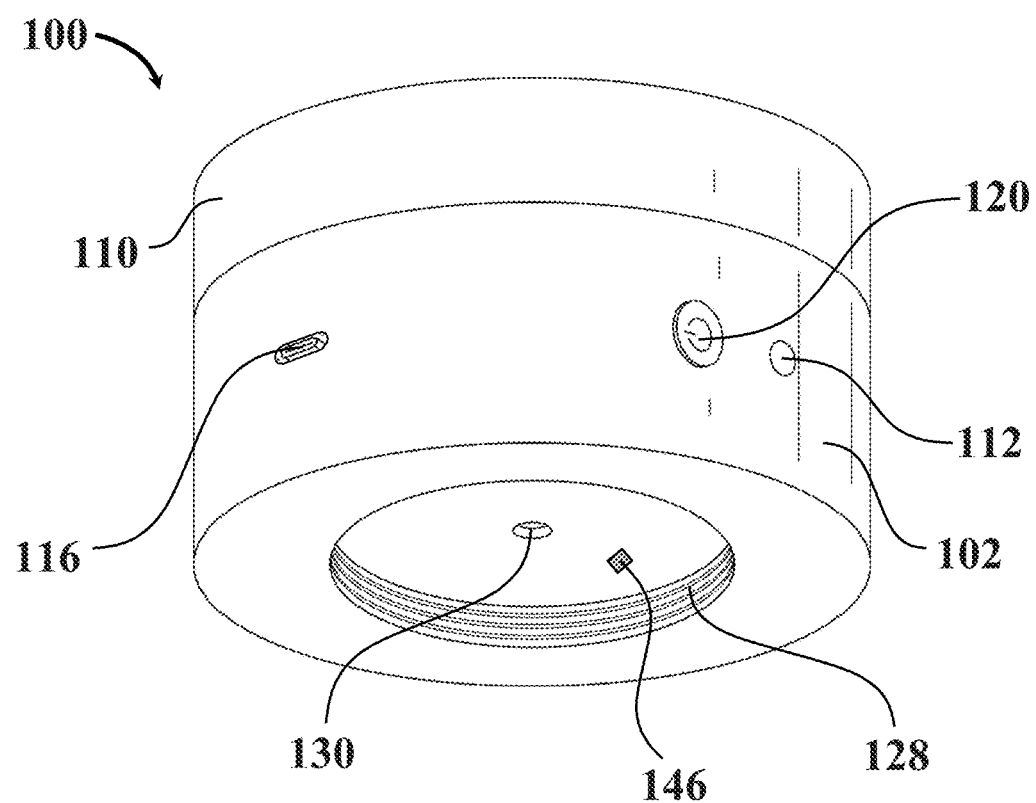
FIG. 2 is a graphical representation depicting a bottom perspective view of a housing of a portable beverage brewing system, according to an embodiment of the present disclosure.
Figure 3:
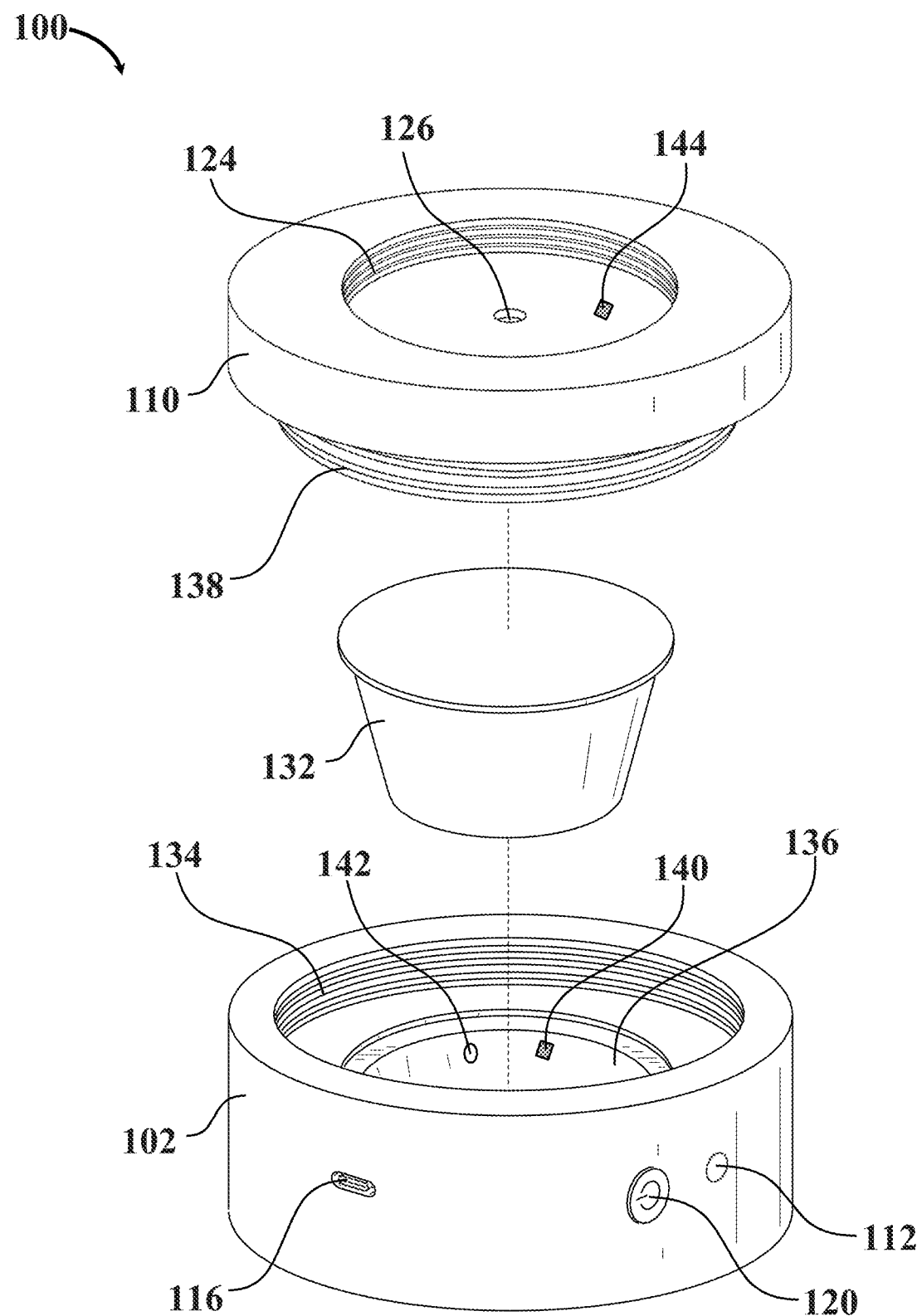
FIG. 3 is a graphical representation depicting an exploded view of a housing of a portable beverage brewing system, according to an embodiment of the present disclosure.

As such, as shown in FIGS. 1-3, in an embodiment, at least one opening of input bottle 104 may be aligned with at least one receiving aperture 126, such that a fluid within input bottle 104 may translate from input bottle 104 into housing 102, via the at least one receiving aperture 126. Moreover, in this embodiment, lid 110 may comprise at least one input sensor 144 (e.g., a pressure sensor) communicatively coupled to the at least one processor. As such, when input bottle 104 is removably coupled to the at least one receiving cavity 126, the at least one input sensor 144 (e.g., a pressure sensor) may be configured to transmit an electrical signal to the at least one processor. In this manner, subsequent to receiving the at least one electrical signal, the processor may be configured to transmit an electrical signal to activation light 112, such that activation light 112 may activate and/or alternate between colors (e.g., blue, green, yellow, red, etc.), providing at least one visual stimulus, allowing at least one user to recognize a successful connection. In some embodiments, at least one receiving cavity 124 of lid 110 may comprise a threading disposed about an internal perimeter of at least one receiving cavity 124, such that any bottle comprising a complimentary threading may be configured to removably couple to the threading of at least one receiving cavity 124.

Additionally, as shown in FIG. 2, in conjunction with FIG. 4, in an embodiment, housing 102 of portable formula brewing system 100 may comprise at least one output cavity 128 disposed about at least one portion of the bottom surface of the housing. In this embodiment, the at least one output cavity 128 may comprise at least one output aperture 130. As such, at least one output cavity 128 may be configured to removably couple (e.g., rotationally couple and/or frictionally couple) to an external output bottle 106 (hereinafter "output bottle 106") (e.g., an infant formula bottle, a water bottle, and/or a plastic water bottle), such that the outer perimeter of at least one output cavity 128 and output bottle 106 may abut, creating a water tight seal. Output bottle 104 may comprise any bottle known in the art configured to retain a fluid. For ease of reference, the exemplary embodiment described herein refers to an infant formula bottle and/or a water bottle, but this description should not be interpreted as exclusionary of other bottles.

Accordingly, as shown in FIGS. 1-3, in an embodiment, at least one opening of output bottle 106 may be aligned with at least one output aperture 130, such that a fluid within housing 102 may translate from housing 102 into output bottle 106, via the at least one output aperture 130. Moreover, in this embodiment, as stated above, housing 102 may comprise at least one output sensor 146 (e.g., a pressure sensor) communicatively coupled to the at least one processor. As such, when output bottle 106 is removably coupled to the at least one output cavity 128, the at least one output sensor 146 (e.g., a pressure sensor) may be configured to transmit an electrical signal to the at least one processor. In this manner, subsequent to receiving the at least one electrical signal, the processor may be configured to transmit an electrical signal to activation light 112, such that activation light 112 may activate and/or alternate between colors (e.g., blue, green, yellow, red, etc.), providing at least one visual stimulus, allowing at least one user to recognize a successful connection. In some embodiments, at least one output cavity 128 of housing 102 may comprise a threading disposed about an internal perimeter of at least one output cavity 128, such that any bottle comprising a complimentary threading may be configured to removably couple to the threading of at least one output cavity 128.

Another feature of the portable formula brewing system is that housing 102 may comprise an internal chamber 134 configured to retain at least one brewing pod 132. As shown in FIG. 3, in an embodiment, at least one internal chamber 134 may comprise a threading disposed about an internal perimeter of at least one internal chamber 134. lid 110 may comprise at least one protrusion 138 disposed about at least a portion of a bottom surface of lid 110. Accordingly, in this embodiment, the at least one protrusion 138 may comprise a threading complimentary to at least one internal chamber 134, such that the at least one protrusion 138 and the at least one internal chamber may be removably coupled, and in this same manner, lid 110 may be removably coupled to housing 102.

As shown in FIG. 3, in conjunction with FIG. 1 and FIG. 2, in an embodiment, at least one internal chamber 134 may comprise at least one compartment 136 configured to retain at least one brewing pod 132, during the brewing process (e.g., formula and/or beverage). As such, at least one compartment 136 is configured to retain at least one brewing pod 132, such that at least one brewing pod 132 will retain it's positioning throughout the brewing process.

In addition, in an embodiment, at least one internal chamber 134 of housing 102 may comprise the at least one heating element (not shown) and/or the at least one cooling element (not shown) disposed within housing 102, the at least one heating element and/or the at least one cooling element being in mechanical communication and/or thermal communication with at least one compartment 136. In this manner, the at least one heating element and/or the at least one cooling element may configured to abut an internal perimeter of the at least one compartment 136, such that the internal perimeter of at least one compartment 136 may be heated and/or cooled, accordingly. The internal perimeter of at least one compartment 136 may comprise any thermally conductive material known in the art (e.g., copper, graphite, polyethylene, nylon 6, epoxy, carbon, ceramic, and/or carbon fiber). For case of reference, the exemplary embodiment described herein refers to copper and/or polyethylene, but this description should not be interpreted as exclusionary of other thermally conductive materials.

Additionally, in an embodiment, the at least one additional cooling element (not shown) and/or the at least one additional heating element (not shown) may be disposed within lid 110. As such, in this embodiment, the at least one additional cooling element and/or the at least one additional heating element may be configured to interact with input bottle 102, such that the at least one additional cooling element and/or the at least one additional heating element may thermally interact with the fluid disposed within input bottle 102. Furthermore, in this embodiment, the at least one cooling element, the at least one heating element, the at least one additional cooling element, and/or the at least one additional heating element may be communicatively coupled to the at least one processor of portable formula brewing system 100.

As such, in an embodiment, the at least one heating element and/or at least one cooling element may be configured to interact with the fluid and/or brewing pod 132, via the internal perimeter of at least one compartment 136, in at least one internal chamber 134 and/or input bottle 104, such that the temperature of the fluid interacting with brewing pod 132 may be altered (e.g., fluid temperature increased and/or fluid temperature decreased). Additionally, in this embodiment, at least one internal chamber 134 may comprise at least one internal chamber sensor 140 communicatively coupled to the at least one processor. As such, when at least one brewing pod 132 is disposed within at least one compartment 136, the at least one internal chamber sensor 140 (e.g., a pressure sensor) may be configured to transmit an electrical signal to the at least one processor. In this manner, subsequent to receiving the at least one electrical signal, the processor may be configured to transmit an electrical signal to activation light 112, such that activation light 112 may activate and/or alternate between colors (e.g., blue, green, yellow, red, etc.), providing at least one visual stimulus, allowing at least one user to recognize a successful placement of at least one brewing pod 132 within at least one compartment 136.

Accordingly, as shown in FIG. 3, in conjunction with FIGS. 1-2, in an embodiment, housing 102 may comprise at least one power supply (e.g., battery) configured to be in electrical communication with each component within portable formula brewing system 100 (e.g., the at least one processor, activation light 112, activation switch 120, the at least one heating element, and/or the at least one cooling element). As such, power port 116 may also be communicatively coupled to the at least one power supply. In this manner, power port 116 may be configured to receive an electrical energy (e.g., voltage), providing a charge to the at least one power supply (e.g., battery), such that the at least one power supply may charge and/or re-charge while portable formula brewing system 100 may be not activated and/or during the brewing process. Additionally, power port 116 may also be configured to provide the electrical energy to each component of housing 102 (e.g., the at least one processor, the at least one heating element, and/or the at least one cooling element), such that when power port 116 receives the electrical energy, each component in housing 102 may be activated.

Moreover, as shown in FIG. 4, in conjunction with FIGS. 1-3, in an embodiment, at least one receiving aperture 126 and/or at least one output aperture 130 may be configured to align with brewing pod 132. In this manner, at least one internal chamber 134 may comprise at least one channel. As such, the at least one channel may be in fluid communication with at least one brewing pod 132, allowing the fluid provided by input bottle 104 to translate (i.e., travel) from input bottle 104 into at least one compartment 136 of housing 102, such that the fluid may interact with a formula and/or beverage material (e.g., powder and/or ground components for infant formula, oatmeal, tea, coffee, soda, etc.) within brewing pod 132. In this manner, the fluid may be passively fed (e.g., gravitationally fed) and/or actively fed into the at least one compartment 136 from input bottle 104. Accordingly, when the fluid interacts with the formula and/or beverage material (e.g., powder and/or ground components for infant formula, oatmeal, tea, coffee, soda, etc.) within brewing pod 132, the fluid may then be configured to travel through the at least one channel to the at least one output aperture 130 and into output bottle 106. Additionally, in this embodiment, the at least one channel may be in thermal communication with the at least one cooling element, the at least one heating element, the at least one additional cooling element, and/or the at least one heating element, such that an internal perimeter of the at least one channel may be heated and/or cooled accordingly. In this manner, the fluid disposed within the at least one channel during transfer from input bottle 104 to the at least one compartment 136 may be heated and/or cooled.

Furthermore, in an embodiment, at least one protrusion 138 of lid 110 may comprise at a first projection (e.g., a hollowed needle), disposed about the bottom surface of at least one protrusion 138. In this embodiment, the first projection may be configured to pierce a top surface of brewing pod 132, when lid 110 is removably coupled to housing 102. As such, the fluid may then be configured to flow directly within brewing pod 132, via the at least one channel, when the brewing process is initiated, allowing for the enhanced interaction between the fluid at the formula material (e.g., powder and/or ground components for infant formula, oatmeal, tea, coffee, soda, etc.). In this same manner, at least one compartment 136 of housing 102 may comprise a second projection disposed about the bottom surface of at least one compartment 136. In this embodiment, the second projection (e.g., a hollowed needle) may be configured to pierce a bottom surface of the brewing pod, when lid 110 is removably coupled to housing 102. Accordingly, the fluid may then be configured to flow directly from within brewing pod 132 toward at least one output aperture 130 into output bottle 106, when the brewing process has completed, via the at least one channel. In some embodiments, the first protrusion and/or or the second protrusion may be configured to pierce a plurality of hole sizes within brewing pod 132, such that the amount of fluid passing through the formula material may be controlled. As such, the plurality of hold sizes may be small, such that the plurality of holes may each act as a filter to prevent the formula material (e.g., powder and/or ground components for infant formula, oatmeal, tea, coffee, soda, etc.) from exiting brewing pod 132, preventing continued brewing with the fluid and/or the disposal of formula material within output bottle 106. In these other embodiments, the plurality of hole sizes may also be specified based on the movement of fluid within the at least one channel and/or brewing pod 132.

As such, in an embodiment, the plurality of holes may comprise a plurality of suitable sizes known in the art to achieve various desired filtration and/or fluid flow properties. By way of non-limiting examples, suitable hole sizes may comprise a range of at least about 0.5 micrometers to at most about 50,000 micrometers, encompassing every value in between. For example, in some embodiments, the plurality of holes may comprise a size of at least 250 micrometers. In addition, in this embodiment, the plurality of holes may comprise a plurality of geometrical shapes suitable to achieve various desired filtration and/or fluid flow properties. Non-limiting examples of the plurality of geometric shapes may include circle, rectangular, square, triangular, irregular, oblong, and/or star-shaped, For ease of reference, the exemplary embodiment described herein refers to a circle, but this description should not be interpreted as exclusionary of other geometrical shapes.

Moreover, in an embodiment, the at least one channel may also comprise at least two valves (e.g., a first valve and/or a second valve) disposed about at least one portion of both the at least one receiving aperture 126 (e.g., a first valve) and/or the at least one output aperture 130 (e.g., a second valve). Additionally, in this embodiment, at least one actuator (not shown) may be disposed within housing 102, such that the at least one actuator may be communicatively coupled to the at least one processor. In this manner, the at least two valves may be in mechanical communication with the at least one actuator, such that the at least one actuator may be configured to translate the at least two valves from an open position (e.g., free flow of the fluid through at least one receiving aperture 126 into the at least one channel and/or the at least one channel into at least one output aperture 130) to a closed position (e.g., complete seal preventing the flow of fluid through the at least one channel). In this embodiment, when the brewing process is initiated (e.g., via activation switch 120 and/or at least one external computing device communicatively coupled to the at least one processor), the at least one processor may be configured to transmit an electrical signal to the at least one actuator, such that the at least one actuator may activate and/or may translate one of the at least two valves disposed about the receiving aperture 126 (e.g., the first valve) into the open position, allowing the fluid to be (e.g., translated) from input bottle 104 into the at least one compartment retaining the at least one brewing pod 132. In this embodiment, the fluid may then be configured to be retained within the at least one compartment, such that the fluid may interact with the formula material within at least one brewing pod 132.

In this manner, as shown in FIG. 3, in conjunction with FIGS. 1-2 and FIGS. 4-5, in an embodiment, at least one mixing mechanism 142 may be disposed within the at least one compartment within housing 102. The at least one fluid mechanism may be in fluidic communication with the fluid and/or the formula material within at least one brewing pod 132. In addition, in this embodiment, at least one mixing mechanism 142 may also be communicatively coupled to the at least one processor. In this manner, when the fluid is detected within the at least one compartment (e.g., at least one fluid and/or at least one temperature sensor, disposed within the at least one compartment of housing 102, communicatively coupled to the at least one processor), the at least one processor may be configured to transmit an electrical signal to at least one mixing mechanism 142, such that the mixing mechanism 142 may be configured to integrate the formula material and/or the formula material properties (e.g., caffeine, vitamins, and/or color) within the fluid, such that the brewed formula and/or beverage may be homogenous. Accordingly, when the brewing process has complete (e.g., the at least one fluid and/or the at least one temperature sensor, disposed within the at least one compartment of housing 102, communicatively coupled to the at least one processor), the at least one processor may be configured to transmit an electrical signal to the at least one actuator, activating the at least one actuator, such that the at least one actuator may be configured to translate at least one additional valve of the at least two valves (e.g., the second valve) disposed about the output aperture 130 to the open position. In this embodiment, the brewed formula and/or beverage may then be disposed into output bottle 106, optimizing the speed of the brewing process and/or the interaction between the fluid and the formula material (e.g., powder and/or ground components for infant formula, oatmeal, tea, coffee, soda, etc.) within brewing pod 132.

In an embodiment, the at least one processor of portable formula brewing system 100 may also comprise programmable and/or executable instructions to brew at least one formula and/or beverage. The programmable and/or executable instructions may be stored within a memory of the computing device. In this embodiment, the instructions may cause the at least one processor to regulate the temperature and/or the consistency (e.g., infant formula requires a specific temperature and consistency to be healthy for an infant to ingest) of the fluid during the brewing process.

In this manner, in an embodiment, portable formula brewing system 100 may comprise at least one temperature sensor (not shown) disposed about at least one portion of the at least one channel and/or at least one compartment 136. The at least one temperature sensor may also be communicatively coupled to the at least one processor. For example, in some embodiments, the executable instructions may cause the at least one processor to initiate the cooling element to cool a brewed beverage within the at least one channel and/or output bottle 106 to a drinking temperature specified in the executable instructions and/or provided by the at least one user, via the at least one user-interface. In this same manner, in another example, in some embodiments, the executable instructions may cause the at least one processor to initiate the at least one heating element to heat the fluid within the at least one channel and/or input bottle 104 to a brewing temperature specified within the executable instructions (e.g., monitoring the temperature via at least one temperature sensor) and/or provided by the at least one user, via the at least one user-interface.

In an embodiment, the at least one processor may be operated on portable formula brewing system 100 (e.g., such as by activation switch 120 configured to be pressed, such that when activation switch 120 is pressed by the at least one user, the at least one processor may initiate the brewing process and/or to allow the at least one user to select at least one of the plurality of parameters for each brewing process, including but not limited to the brewing temperature and/or brewing time, via the at least one user-interface and/or a display device associated with the computing device of portable formula brewing system 100). In this embodiment, the at least one processor may also be operated from at least one external computing device (e.g., mobile phone, computer, laptop, and/or tablet), in which the at least one external computing device may be configured to provide the instructions to the at least one processor to initiate, maintain, and/or update the instructed brewing process (e.g., during the brewing process, increase and/or decrease the brewing temperature, and/or increase and/or decrease the predetermined time the fluid interacts with the formula material (e.g., powder and/or ground components for infant formula, oatmeal, tea, coffee, soda, etc.) in the at least one brewing pod 132).

Figure 5:
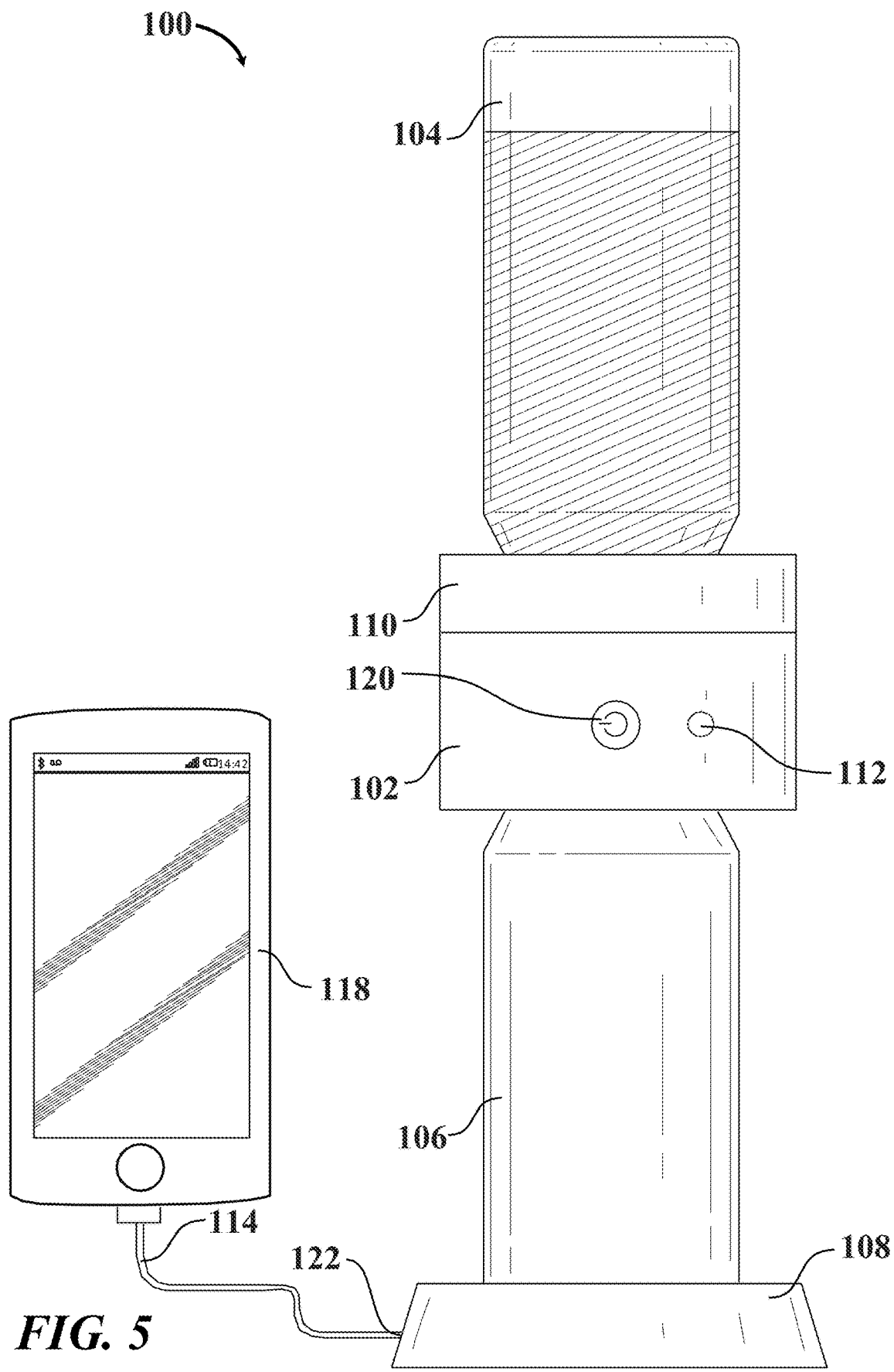
FIG. 5 is graphical representation depicting the portable beverage brewing system of FIG. 4 comprising a power station, according to an embodiment of the present disclosure.

As shown in FIG. 4 and FIG. 5, in conjunction with FIGS. 1-3, in an embodiment, portable formula brewing system 100 may also comprise a power station 108 configured to be in electrical communication with housing 102. In this manner, power station 108 may comprise at least one energy port 122. In this embodiment, power station 108 may be configured to provide power to housing 102 and/or the at least one power supply, such that power station 108 may be configured to power housing and recharge the at least one power supply, simultaneously. In this manner, at least one energy port 122 of power station 108 may be in electrical communication with at least one power port 116 of housing 102, via electrical circuitry 114.

In addition, in some embodiments, power station 108 may be configured to wirelessly activate and/or provide power to housing 102 and/or the at least one power supply (e.g., electromagnetic induction). In addition, as shown in FIG. 5, in conjunction with FIGS. 1-3, energy port 116 may also be configured to provide the electrical energy to at least one external computing device 118 (e.g., mobile phone, smartphone, tablet, computer, and/or laptop). In these other embodiments, at least one external computing device 118 may be configured to be communicatively coupled to energy port 122, via electrical circuitry 114. Accordingly, the at least one external computing device 118 may receive the electrical voltage from energy port 116, via electrical circuitry, allowing the at least one electric device to recharge.

Figure 6:
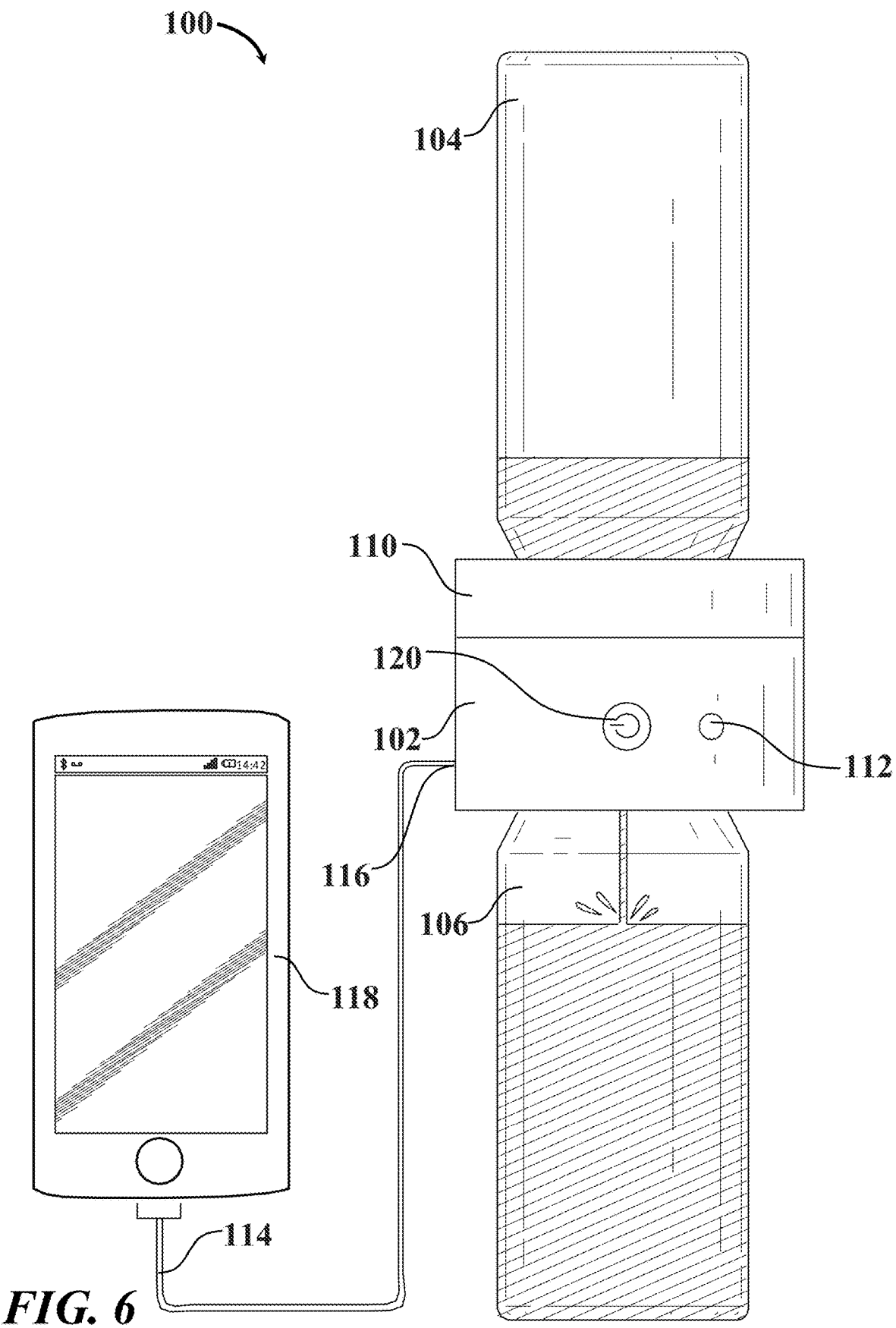
FIG. 6 is a graphical representation depicting the exemplary embodiment of the portable beverage brewing system of FIG. 5 communicatively coupled with a computing device, according to an embodiment of the present disclosure.

In this same manner, as shown in FIG. 6, in conjunction with FIGS. 1-3, in an embodiment, power port 116 may also be configured to output the electrical energy (e.g., voltage), such that the at least one power supply may provide the electrical energy to at least one external computing device 118 (e.g., mobile phone, smart phone, tablet, computer, and/or laptop). In this embodiment, as shown in FIG. 6, at least one external computing device 118 may be configured to be communicatively coupled to portable formula brewing system 110, via a direct connection to power port 116 with electrical circuitry 114. Accordingly, the at least one external computing device 118 may receive the electrical voltage from power port 116, via electrical circuitry, allowing the at least one electric device to recharge. Furthermore, in this embodiment, as previously stated, at least one external computing device 118 may be communicatively coupled to the at least one processor of portable formula brewing system 100. As such, at least one external computing device 118 may be configured to transmit an electrical signal to the at least one processor comprising each of the plurality of parameters selected by the at least one user. In addition, in this embodiment, at least one external computing device may be configured to transmit an electrical signal to the at least one processor of portable formula brewing system 100 to initiate and/or cancel the brewing process. In some embodiments, at least one external computing device may be in electrical communication with each component of portable formula brewing system 100 via a direct connection with power port 116 by electrical circuitry 114.

Figure 7:
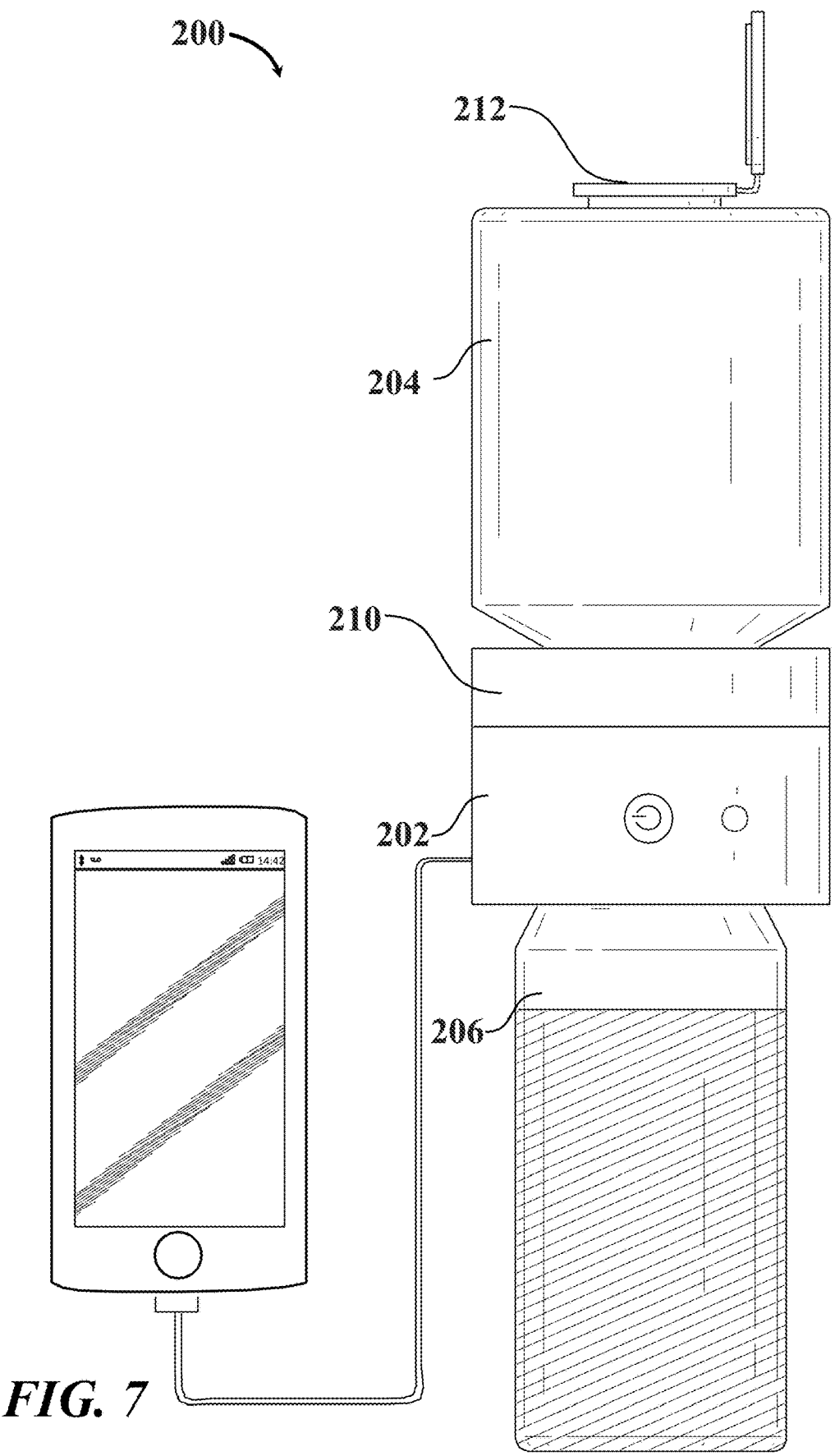
FIG. 7 is a graphical representation depicting a second exemplary embodiment of a portable beverage brewing system, according to an embodiment of the present disclosure.

FIG. 7 depicts a graphical representation depicting a second exemplary embodiment of a portable beverage brewing system, according to an embodiment of the present disclosure. As such, as shown in FIG. 7, in conjunction with FIGS. 1-3, in an embodiment, portable formula brewing apparatus 200 may comprise an input reservoir 204. In this manner, input reservoir may be affixed to lid 210, such that when lid 210 is removed from housing 202, input reservoir 204 may be removed as well. Accordingly, the fluid may be disposed within input reservoir 204, via at least one receiving opening 212 disposed about at least a portion of a top surface of input reservoir 204. In this embodiment, at least one receiving opening 212 may be configured to be removably coupled to input reservoir, such that a water tight seal may be formed. In this manner, when portable formula brewing system 200 is translated, any fluid disposed within input reservoir 204 may be retained within input reservoir 204. Moreover, in this embodiment, input reservoir 204 may comprise a light-weight, non-toxic material (e.g., polyethylene, aluminum, etc.) such that portable formula brewing system 200 may comprise a weight, height, length, and/or width, as disclosed above.

Method of Use

Figure 8:
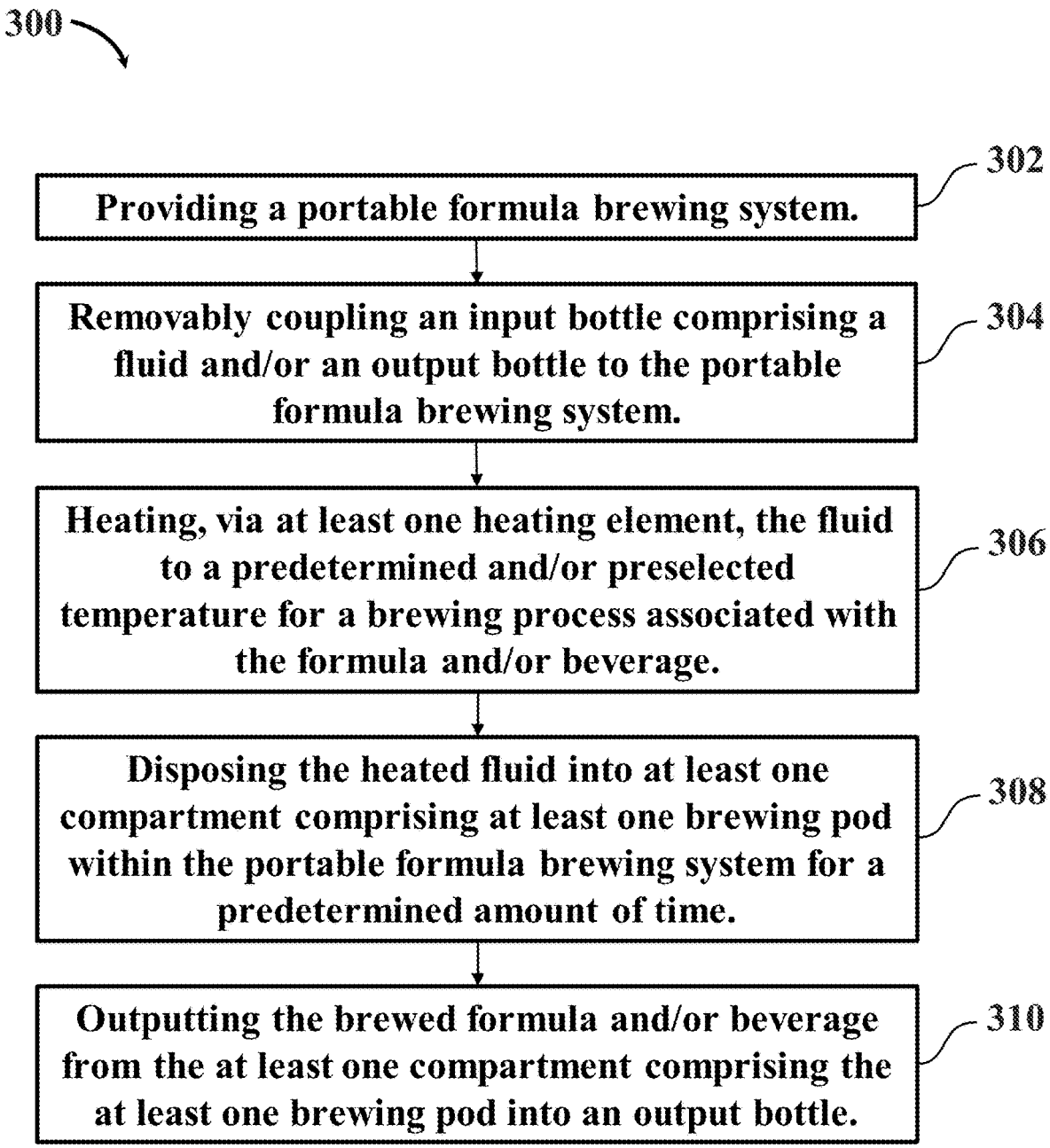
FIG. 8 is a flow chart depicting the steps of an exemplary method of brewing and/or dispensing a formula and/or a beverage, via a portable beverage brewing system, according to an embodiment of the present disclosure.

FIG. 8, in conjunction with FIGS. 1-7, depicts a flow chart providing the steps of a method 300 of brewing a formula and/or beverage using a portable formula brewing system 100, 200. The steps delineated in FIG. 8 are merely exemplary of an order of brewing a formula and/or beverage using a portable formula brewing system 100, 200. The steps may be carried out in another order, with or without additional steps included therein.

As shown in FIG. 8, in conjunction with FIGS. 1-7, in an embodiment, the method 300 begins at step 302, in which a portable formula brewing system 100 comprising a housing 102 and/or lid 110 may be provided. The next step, step 304, comprises removably coupling input bottle 104 comprising a fluid to portable formula brewing system 100. Additionally, in this embodiment, input bottle 104 and/or output bottle 106 may be configured to removably couple to lid 110 and/or housing 102, respectively, such that a water tight seal may be created between lid 110 and input bottle 104 and/or housing 102 and output bottle 106. Subsequently, at step 306, the fluid may be heated, via the at least one heating element of portable formula brewing system 100, such that the fluid may be heated to a predetermined and/or preselected temperature for the brewing process associated with the selected formula and/or beverage. Furthermore, the next step, step 308, comprises disposing, via the at least one channel, the heated fluid into at least one brewing pod 132, disposed within the at least one compartment 136 of housing 102 of portable formula brewing system 100 for a predetermined amount of time as designated by the brewing process for the selected formula and/or beverage. Finally, at step 310, the brewed formula and/or beverage may be outputted from at least one compartment 136 comprising at least one brewing pod 132 into output bottle 106, via the at least one channel.

As such, in this embodiment, the at least one processor of portable formula brewing system 100 may be configured to implement programmable and/or executable instructions, such that when executed, may cause the at least one processor to initiate the formula and/or beverage brewing process including, but not limited to: (i) heating of the fluid in the at least one channel and/or input bottle 104, via the heating element, to a preselected temperature specified in the brewing protocol and/or by the at least one user, via the at least one user-interface, (ii) opening the at least one channel into at least one compartment 136 for a predetermined amount of time (e.g., allowing the fluid to enter the interior of the at least one brewing pod 132, such that the fluid may interact with the formula material (e.g., powder and/or ground components for infant formula, oatmeal, tea, coffee, soda, etc.) within the at least one brewing pod 132), (iii) closing the at least one channel out of the at least one brewing pod 132, allowing the fluid and the formula material to interact, such that the formula and/or beverage may be brewed; and/or (4) subsequent to reaching the predetermined amount of time, opening the at least one channel into the output bottle 106, such that the brewed formula and/or brewed beverage may be outputted and/or disposed into output bottle 106.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A system of portable formula, beverage, or both brewing, the system comprising:
    a housing comprising an internal chamber, the internal chamber comprising at least one compartment configured to retain at least one brewing pod;
    an input bottle comprising at least one opening, the input bottle configured to removably couple to a top surface of the housing;
    an output bottle comprising at least one opening, the output bottle configured to removable couple to a bottom surface of the housing;
    at least one heating element, at least one cooling element, or both, in mechanical communication, thermal communication, or both with the at least one brewing pod, a fluid, or both, wherein the at least one heating element, the at least one cooling element, or both are disposed within the internal chamber of the housing;
    wherein the housing comprises at least one channel in fluid communication with the input bottle and the output bottle;
    wherein the fluid disposed within the input bottle is configured to translate through the at least one channel into the at least one compartment, whereby the fluid interacts with the at least one brewing pod;
    wherein the at least one channel comprises at least two valves disposed about at least a portion of the at least one channel, whereby the at least two valves are configured to translate between an open position and a closed position; and
    wherein subsequent to interacting with the at least one brewing pod for a predetermined amount of time, the brewed formula, brewed beverage, or both translates through the at least one channel into the output bottle.

2. The system of claim 1, wherein the housing further comprises a lid, the lid being configured to be removably coupled to the housing.

3. The system of claim 2, wherein an internal perimeter of the internal chamber comprises a threading.

4. The system of claim 3, wherein a bottom surface of the lid comprises a protrusion having a threading complimentary of the internal perimeter of the internal chamber.

5. The system of claim 1, further comprising at least one actuator, the at least one actuator being in mechanical communication with the at least two valves.

6. The system of claim 5, further comprising a computing device having at least one processor, wherein, subsequent to receiving an electrical signal to initiate a brewing process, the at least one processor is configured to transmit an electrical signal to the at least one actuator to translate one of the at least two valves from the closed position to the open position, whereby the fluid is allowed to flow into the at least one compartment, thereby interacting with the at least one brewing pod.

7. The system of claim 6, wherein, subsequent to reaching the predetermined amount of time, the at least one processor is configured to transmit an electrical signal to the at least one actuator to translate an additional valve of the at least two valves from the closed position to the open position, whereby the brewed formula, brewed beverage, or both is allowed to flow from the at least one compartment into the output bottle.

8. The system of claim 7, further comprising the following:
    at least one user-interface communicatively coupled to the at least one processor of the computing device;
    executable instructions selected by at least one user, via the at least one user-interface;
    wherein the executable instructions comprise a plurality of predetermined parameters associated with the selected formula, beverage, or both; and
    wherein subsequent to the selected executable instructions being transmitted to the at least one processor, the at least one processor initiates the at least one heating element, the at least one cooling element, or both to regulate the temperature of the fluid based on the predetermined parameters associated with the selected formula, beverage, or both.

9. The system of claim 1, further comprising at least one power station.

10. The system of claim 8, wherein the at least one power station is configured to provide an electrical energy to at least one power supply of the portable formula brewing system, whereby the at least one power supply is charged while the portable formula brewing system is activated, deactivated, or both.

11. A system for portable formula, beverage, or both brewing, the system comprising:

a housing comprising an internal chamber, the internal chamber comprising at least one compartment configured to retain at least one brewing pod;

an input bottle comprising at least one opening, the input bottle configured to removably couple to a top surface of the housing;

an output bottle comprising at least one opening, the output bottle configured to removable couple to a bottom surface of the housing, wherein the housing comprises at least one channel in fluid communication with the input bottle and the output bottle;

at least one heating element, at least one cooling element, or both, in mechanical communication, thermal communication, or both with the at least one brewing pod, the fluid, or both, wherein the at least one heating element, the at least one cooling element, or both are disposed within the internal chamber of the housing;

at least two valves disposed about at least a portion of the at least one channel, whereby the at least two valves are configured to translate between an open position and a closed position;

at least one actuator, the at least one actuator being in mechanical communication with the at least two valves;

a computing device having at least one processor, wherein subsequent to receiving an electrical signal to initiate a brewing process, the at least one processor is configured to transmit an electrical signal to the at least one actuator to translate the at least two valves from the closed position to the open position, thereby regulating the interaction of the fluid with the at least one brewing pod; and wherein subsequent to interacting with the at least one brewing pod for a predetermined amount of time, the brewed formula, brewed beverage, or both translates through the at least one channel into the output bottle.

12. The system of claim 11, further comprising the following:

at least one user-interface communicatively coupled to the at least one processor of the computing device;

executable instructions selected by at least one user, via the at least one user-interface;

wherein the executable instructions comprise a plurality of predetermined parameters associated with the selected formula, beverage, or both; and wherein subsequent to the selected executable instructions being transmitted to the at least one processor, the at least one processor initiates the at least one heating element, the at least one cooling element, or both to regulate the temperature of the fluid based on the predetermined parameters associated with the selected formula, beverage, or both.

13. The system of claim 11, further comprising at least one power station.

14. The system of claim 13, wherein the at least one power station is configured to provide an electrical energy to at least one power supply of the portable formula brewing system, whereby the at least one power supply is charged while the portable formula brewing system is activated, deactivated, or both.

* * * * *